United States Patent [19]

Murata et al.

[11] Patent Number: 4,677,485
[45] Date of Patent: Jun. 30, 1987

[54] VIDEO SIGNAL PROCESSING CIRCUITS IN TELEVISION RECEIVERS

[75] Inventors: Toshinori Murata; Nobufumi Nakagaki; Takaaki Matono, all of Yokohama, Japan

[73] Assignee: Hitachi, Ltd., Tokyo, Japan

[21] Appl. No.: 816,307

[22] Filed: Jan. 6, 1986

[30] Foreign Application Priority Data

Jan. 14, 1985 [JP] Japan .................................. 60-3380

[51] Int. Cl.$^4$ .............................................. H04N 5/14
[52] U.S. Cl. .................................... 358/160; 358/133
[58] Field of Search ...................... 358/160, 133, 135; 375/31

[56] References Cited

U.S. PATENT DOCUMENTS 3,435,134  3/1969  Richards ............................ 358/133
3,784,737  1/1974  Waehner ............................ 358/133

OTHER PUBLICATIONS

"Application of Picture Memories in Television Receivers" by Berkhoff et al. IEEE 1983.

Primary Examiner—Tommy P. Chin
Assistant Examiner—David E. Harvey
Attorney, Agent, or Firm—Antonelli, Terry & Wands

[57] ABSTRACT

A video signal processing circuit for producing a still image picture which can be reduced memory capacity. A digital video signal is divided into higher-significant bit and lower-significant bit which are stored in separate addresses of a memory device. The higher-significant bit data is written in the first address. The lower-significant bit data and an identification data signal are written in the following addresses when the present higher-significant bit data is the same as former higher-significant bit data written in the previous address. The lower-significant bit data and a higher-significant bit data of 1 bit are written in the following addresses when the present higher-significant bit data is different from the former higher-significant bit data of the previous address. When the data read from the memory device are the higher-significant bit data, they are compared with the previously read higher-significant bit data, and the lower-significant bit data is produced in a certain value and then the produced lower-significant bit data and the higher-significant bit data read from the memory device are combined to be outputted as a complete video signal. When the data read from the memory device is a lower-significant bit data, the latest higher-significant bit data stored in the previous address is combined with the read lower-significant bit data to be produced as a complete video signal.

4 Claims, 3 Drawing Figures

VIDEO SIGNAL PROCESSING CIRCUITS IN TELEVISION RECEIVERS

BACKGROUND OF THE INVENTION

This invention relates to video signal processing for freezing one picture frame or field of motion pictures to obtain a still picture on a television receiver, and particularly to a circuit capable of producing a still picture of high quality in a system having a small memory capacity.

A television receiver is known in which a video signal is digitized and processed in digital form to additionally provide a variety of new functions.

One of the functions is that one frame or field of a motion picture displayed on the faceplate of a cathoderay tube of a television receiver may be displayed as a still picture. This function of converting from motion pictures to a still picture is referred to as a frame freezing, still frame or stop action.

In order to create the freeze function, a memory is needed for storing a digital video signal of one field or one frame. This field or frame memory is described in "Applications of Picture Memories in Television Receivers", IEEE Transaction on Consumer Electronics, Vol. CE-29, No. 3, August, 1983, by E. J. Berkhoff, et al.

A memory capacity M for storing one field of video signals can be expressed as $$M = 8 \times \frac{14.32 \times 10^6}{15.75 \times 10^3} \times \frac{525}{2} = 1.9 \text{ (megabits)}$$

assuming that the clock frequency is 4 $f_{sc}$ (14.32 MHz, $f_{sc}$ is the color subcarrier frequency), the horizontal scanning frequency is 15.75 KHz, the number of horizontal scanning lines per field is 525/2, and the quantized bit number is 8. From this expression it will be understood that a memory of a very large capacity is necessary for storing one field of a video signal.

SUMMARY OF THE INVENTION

It is an object of the invention to reduce the capacity of the memory being used in the freezing device of a television receiver.

According to this invention, a digitized video signal is divided into higher-significant bit data and lower-significant bit data. The higher significant bit data is written in the first address of a memory. In the second address and the following addresses of the memory, the lower-significant bit data and an identification data signal of 1 bit are written when the higher-significant bit data is the same as that in the previous address, or the higher-significant bit data and a higher-significant bit data identification signal of 1 bit are written when the higher-significant bit data is different from that in the previous address.

When the data read from the memory, in which video data is stored, is the higher-significant bit data, the data is compared with the previously read higher-significant bit data, the lower-significant bits are decided to be predetermined values in accordance with the difference, and the lower-significant bit data and the higher-significant bit data read from the memory are combined with each other and outputted.

On the other hand, when the data read from the memory is the lower-significant bit data, the newest higher-significant bit data stored in the previous address is combined with the read lower-significant bit data to be produced. Thus, the necessary memory capacity can be reduced to $$\frac{\text{The number of bits of the higher-significant bit data} + 1}{\text{The total number of bits}}$$

where 1 is the amount of data added for the higher-significant and lower-significant bit data identification signal.

DESCRIPTION OF THE PREFERRED EMBODIMENT

Figure 1:
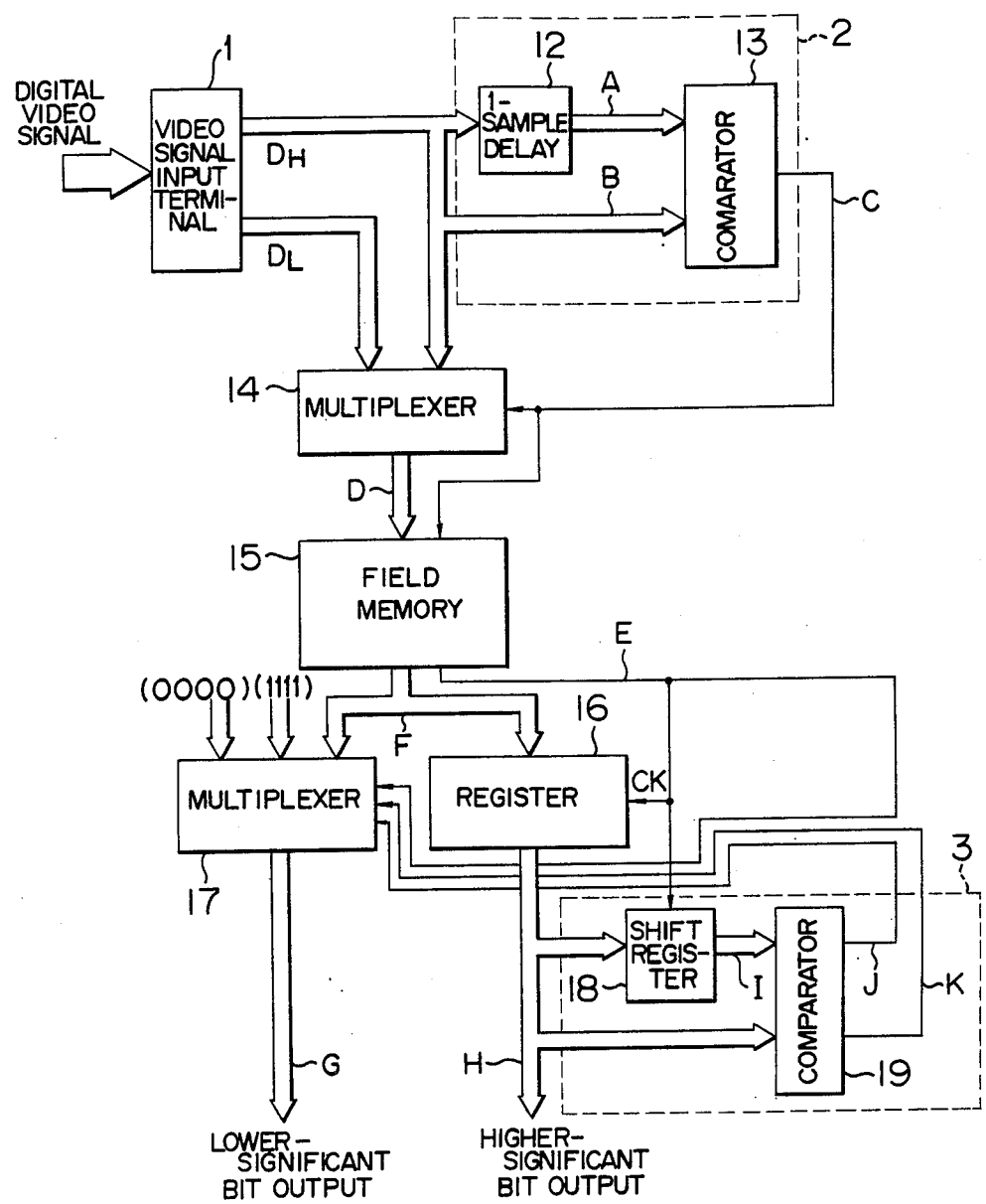
FIG. 1 is a block diagram of a video signal processing circuit of the invention.

FIG. 1 is a block diagram of a video signal processing circuit of this invention. The video signal processing circuit of this invention comprises a video signal input terminal 1, a detecting circuit 2, a decision circuit 3, a multiplexer 14, a field memory 15, a register 16 and a multiplexer 17.

The detecting circuit 2 includes a one-sample delay circuit 12 for delaying by one-sample time the input signal thereto, and a comparator 13.

The decision circuit 3 includes a shift register 18 serving as a one-sample delay circuit, and a comparator 19.

The input terminal 1 is a terminal to which a digital video signal is applied in parallel bits. For convenience of explanation of this invention, the digital video signal applied to the input terminal 1 is assumed to be of 8 bits. Thus, the input terminal 1 has 8 terminals corresponding to the 8 bits of the input digital video signal.

To the first four terminals of the input terminal 1 corresponding to the 4 higher-significant bits of the digital video signal are applied higher-significant bit data $D_H$, and to the second four terminals of the input terminal 1 corresponding to the 4 lower-significant bits of the digital video signal are applied lower-significant bit data $D_L$. The higher-significant bit data $D_H$ is fed on the one hand from the input terminal 1 to the comparator 15 through the one-sample delay circuit 12, and on the other hand, directly to the comparator 13, which provides an output to control the multiplexer 14. The lower-significant bit data $D_L$ is fed from the input terminal 1 directly to the multiplexer 14.

The detecting circuit 2 detects a change in the higher-significant bit data $D_H$, and when the data $D_H$ has changed, it produces at its output a logic "1". The comparator 13 compares data B fed directly thereto and data A fed through the delay circuit 12 thus delayed one-sample period.

If both data are not coincident (A≠B), the comparator 13 produces a signal of H-level (logic "1"), and supplies it to the multiplexer 14, which then selects the higher-significant bit data $D_H$ of both data $D_H$ and $D_L$.

The field memory 15 stores the output $D_H$ selected by the multiplexer 1 and at the same time stores the output (logic "1") signal C from the comparator 13 which output, as an identification code, indicates that the higher-significant bit data $D_H$ has been stored in the field memory 15.

If both data A and B are coincident (A=B), the comparator 13 produces a signal of L-level (logic "0"), and supplies it to the multiplexer 14, which then selects the lower-significant bit data $D_L$ and supplies it to the field memory 15. Thus, the field memory 15 stores the lower-significant data $D_L$ and the output (logic "0") signal C from the comparator 13 as an identification code indicating that the data $D_L$ has been stored in the field memory 15.

Thus, when the video signal data is greatly changed (luminance change) as in the outline of the image, and hence the higher-significant bits of the video signal are changed, the field memory 15 stores only the higher-significant bit data. When the video signal data is little changed as in the flat portion of the image and hence the higher-significant bits of the video signal are not changed, the field memory 15 stores only the lower-significant bits which change. Also, this field memory 15 stores the identification code C of 1 bit which indicates whether the stored 4-bit data is the higher-significant bits or the lower-significant bits.

The reading operation of the field memory 15 will be described below. The 4-bit data F read from the field memory 15 is supplied to the multiplexer 17 or the register 16 depending on the identification code E read at the same time. In other words, when the identification code E is a H-level signal indicative of the higher-significant bit data $D_H$, the data F read from the field memory 15 is held in the register 16. On the other hand, when the identification code signal E is a L-level signal indicative of the lower-significant bit data $D_L$, the data F read from the field memory 15 are supplied to the multiplexer 17.

The identification code signal E is supplied to a clock input terminal CK of the register 16. The identification code signal E takes H-level, or logic "1" each time it indicates the higher-significant bit data $D_H$. Thus, the identification code signal E is a pulse signal E as shown in FIG. 2b. Therefore, if this pulse output signal E is supplied to the register 16 as a clock signal, the register 16 will store the data F as new data each time the higher-significant bit data $D_H$ is read from the field memory 15. The data (higher-significant bits) are held in the register 16 during the period in which the less significant bit data is read from the field memory 15.

Figure 2:
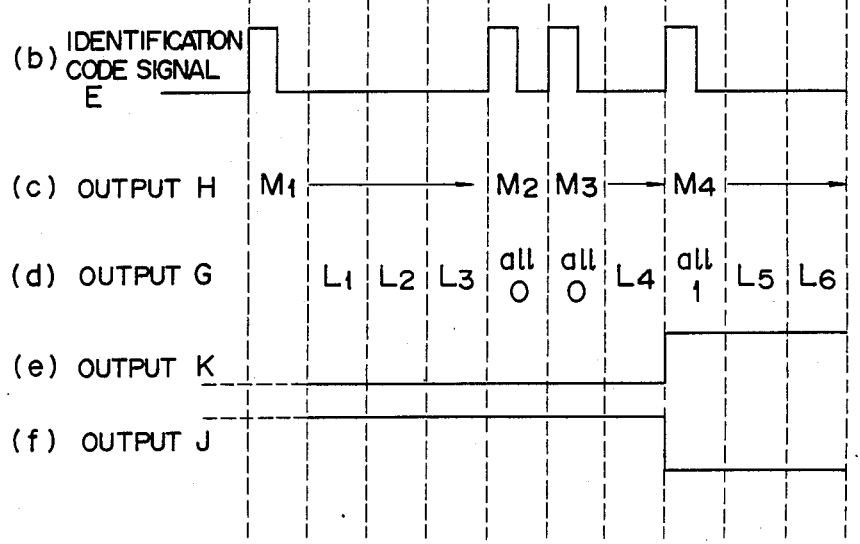
FIG. 2 shows output data and output waveforms at each portion of the video signal processing circuit shown in FIG. 1.

FIG. 2 shows the relation between the data F read from the field memory 15 and the data H, G read from the register 16 and multiplexer 17.

FIG. 2a shows the time series of the data F read from the field memory 15, FIG. 2b shows the waveform of the identification code signal E supplied to the register 16, FIG. 2c shows the output signal H from the register 16, and FIG. 2d shows the output signal G from the multiplexer 17.

As will be understood from FIG. 2c, the output signal H in the register 16 is maintained as the same data during the period T between the H-level of the identification code signal E at address 1 and the next H-level thereof.

The operation of the decision circuit 3 including the multiplexer 17 and the comparator 19 will be described. In FIG. 2, it is assumed that the more significant bit data $M_1$, $M_2$, $M_3$ and $M_4$ stored in the field memory is in the relation of $M_1 < M_2 < M_3 > M_4$.

The multiplexer 17 selects and supplies one of three pieces of data; the output F (4 bits) from the field memory 15, fixed data $D_{LO1}$ "1111" (4 bits are all 1) and fixed data $D_{LO2}$ "0000" (4 bits are all 0). The selection of data is made as follows. The fixed data $D_{LO1}$, $D_{LO2}$ will be described later.

The shift register 18 delays the output signal H from the register 16 by one period of the identification code signal E and supplies the output signal I to the comparator 19.

The comparator 19 compares the output signal H from the register 16 and the output signal I from the shift register 18. The output signal J from the comparator 19 becomes H-level when the higher-significant data $D_H$ are decreased (B<A). The output signal K from the comparator 19 is the reverse of the output signal J, and becomes H-level when the higher-significant bit data $D_H$ is increased (B>A). To the multiplexer 17 are supplied the output signals J and K from the comparator 19 and the identification signal E from the field memory as output selection signals so that one piece of data is selected from the data signal F from the field memory 15 and two pieces of fixed data, $D_{LO2}$ (0000), $D_{LO1}$ (1111).

If the identification signal E from the field memory 15 is L-level, the multiplexer 17 preferentially selects the data F read from the field memory 15 and produces it, and when the higher-significant bit data $D_H$ is decreased (B<A), the multiplexer 17 selects the fixed data $D_{LO1}$ (1111) and produces it. When the higher-significant data $D_H$ is increased (B>A), the fixed data $D_{LO2}$ (0000) is produced therefrom.

FIG. 2d shows the output signal G from the multiplexer 17.

Referring to FIG. 2, when data at address 2, 3, 4, 7, 9, 10 are read, the data F from the field memory 15 is produced as it is because the identification code signal E is L-level. When data at address 5 is read, the multiplexer 17 produces fixed data $D_{LO2}$ (0000) or fixed data $D_{LO1}$ (1111) depending on the output from the comparator 19 because the identification code signal E is H-level. At address 5, the output H from the register 16 is data $M_2$, the output signal I from the shift register 18 is data $M_1$ and data $M_1$ is smaller than data $M_2$, or $M_1 < M_2$. Thus, the output signal J from the comparator 19 is H-level which indicates the increase of higher-significant bit data $D_H$. Accordingly, the multiplexer 17 produces fixed data $D_{LO2}$ (0000). Similarly, when data at address 6 is read, the identification code signal E is H-level and the output signal J from the comparator 19 is H-level, thus the multiplexer 17 produces fixed data $D_{LO2}$ (0000).

When data at address 8 is read, the identification code signal E is H-level, but data $M_3$ is larger than $M_4$. Thus, since the output signal J from the comparator 19 is L-level and the output signal K therefrom is H-level, the multiplexer 17 produces fixed data $D_{LO1}$ (1111).

Therefore, by using the 5-bit field memory, it is possible to quantize the outline portion of the image in 4 bits and the flat portion in equivalently 8 bits.

Description will be made of the reason why the lower-significant bits are all set to "0" or "1" when the higher-significant bits are changed.

Figure 3:
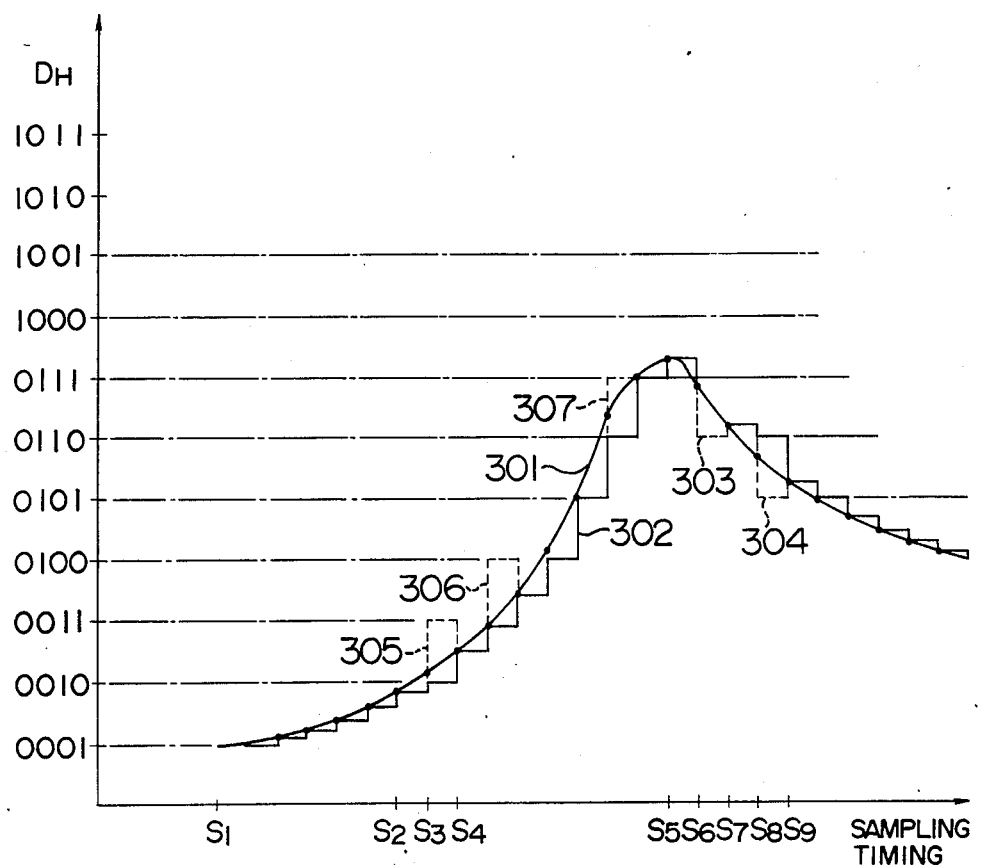
FIG. 3 shows an input analog signal and a digital signal obtained by digitizing the analog signal.

FIG. 3 shows the analog signal AN and the compressed and digitized signal according to this invention.

The curve 301 represents the analog signal AN and the stair-stepped line 302 represents the digital signal. The abscissa shows the sampling timing, and the ordinate indicates the signal level. The 4-bit numbers on the calibrated ordinate each represent the 4 higher-significant bits of the digital signal.

When the analog signal 301 is little changed as shown by the period of the timing $S_1$ to $S_2$, the signal (0001) is held in the register 16 and the multiplexer 17 selects data of the 4 lower-significant bits and produces it at its output.

When data at sampling $S_3$ is read from the field memory 15, the data $D_H$ of the higher-significant bits is changed from (0001) to (0010), and thus the identification code signal E changes to H-level. Consequently, data read from the field memory 15 is held in the register 16. At this time, the multiplexer 17 is supplied with the higher-significant bit data $D_H$ from the field memory 15. If the higher-significant bit data is produced as it is therefrom, the lower-significant bit data increases with the increase of the higher-significant bit data.

On the other hand, if the higher-significant data $D_H$ is read from the field memory 15, fixed data $D_{LO}$ can be produced as lower-significant bit data $D_L$. However, if the data is simply selected to be (0000) or (1111) or intermediate value (0111), (0110), there is the possibility that the analog signal AN and the digital signal become greatly different.

Thus, according to this invention, when the higher-significant bit data $D_H$ of the original signal tends to increase, the lower-significant bit data $D_L$ is fixed to fixed data $D_{LO2}$ (0000), while when it tends to decrease, the lower-significant data $D_L$ is fixed to fixed data $D_{LO1}$ (1111). At sampling time $S_3$, the multiplexer 17 produces fixed data $D_{LO2}$ (0000) as lower-significant bit data $D_L$ since the higher-significant bit data $D_H$ is increased from (0001) to (0010).

At sampling time $S_4$, since the higher-significant bit data $D_H$ remains unchanged, (0010), the multiplexer 17 selects the output signal F from the field memory 15 and produces it as it is.

Description will be made of the case in which the higher-significant bit data $D_H$ read from the field memory 15 decreases.

At sampling timing $S_6$, since the data $D_H$ of 4 higher-significant bits is decreased from (0111) to (0110), the identification code signal E is changed to H-level and thus the data read from the field memory 15 is held in the register 16. The comparator 19 produces output signal J of L-level and output signal K of H-level since the output signal I from the shift register 18 is larger than the output H from the register 16. The multiplexer 17 produces fixed data $D_{LO1}$ (1111).

At sampling timing $S_7$, since the higher-significant bit data $D_H$ is not changed, the multiplexer 17 produces the lower-significant bit data $D_L$ as it is.

This invention will be compared with the system in which the lower-significant bit fixed data $D_{LO}$ is not selected in accordance with the increase or decrease of the higher-significant bit data $D_H$ unlike this invention.

The broken lines 303 and 304 in FIG. 3 show digital data $(D_H+D_L)$ in the case in which the lower-significant bit fixed data $D_{LO}$ is made $D_{LO2}$ (0000) irrespective of the increase or decrease of the higher-significant bit data $D_H$.

At sampling timing $S_6$, the higher-significant bit data $D_H$ is decreased from (0111) to (0110). At this time, when the lower-significant bit fixed data $D_{LO}$ is made $D_{LO2}$ (0000), the digital data $(D_H+D_L)$ at sampling timing $S_6$ is less than the digital data $(D_H+D_L)$ at sampling timing $S_7$, that is, the data is reversed. Similarly, between sampling timings $S_8$ and $S_9$ is reversed data.

On the other hand, in the case of an increase of the higher-significant bit data $D_H$, when the lower-significant bit fixed data $D_{LO}$ is made $D_{LO1}$ (1111) as in the case in which the higher-significant bit data $D_H$ is decreased, data is reversed as shown in FIG. 3 by broken lines 305, 306 and 307.

According to this invention, when the higher-significant bit data $D_H$ increases, the lower-significant bit fixed data $D_{LO}$ is made $D_{LO2}$ (0000), so that the digital data $(D_H+D_L)$ having the same higher-significant bit data is reduced to the minimum value $(D_H+D_{LO2}$ (0000)). Also, when the higher-significant bit data $D_H$ is decreased, the lower-significant bit fixed data $D_{LO}$ is made $D_{LO1}$ (1111) so that digital data $(D_H+D_L)$ having the same higher-significant bit data is made the maximum value $(D_H+D_{LO1}$ (1111)). Therefore, no reversing of the data occurs.

We claim:

1. A video signal processing circuit for use in television receivers having an input terminal to which a digitized video signal is applied, and a memory for storing the digitized video signal supplied through the input terminal, said video signal processing circuit comprising:

detecting means connected to receive the higher-significant bits of said digitized video signal for detecting a change in the value of the higher-significant bit data and for producing a selection code signal in response thereto;

first selection means connected to receive said digitized video signal and said selection code signal from said detecting means for selecting either the higher-significant bits or the lower-significant bits of said digitized video signal in accordance with said selection code signal;

memory means connected to said first selection means and said detecting means for storing the bits of said digitized video signal which are selected by said first selection means along with the selection code signal from said detecting means and for reading out as an output signal the stored bits of said digitized video signal along with the selection code signals stored therewith;

register means connected to said memory means for storing said output signal from said memory means when the selection code signal read from said memory means indicates that the accompanying bits read from said memory means are the higher-significant bits of said digitized video signal;

decision means connected to said memory means and said register means for detecting a change of the bits held in said register means and for producing a decision output in response thereto; and second selection means connected to said memory means and said decision means and supplied with first and second fixed signals for selecting and producing one of said first and second fixed signals or the output signal from said memory means in accordance with the selection code signal read from said memory means and the decision output from said decision means, such that (1) the output signal from said memory means is produced when the selection code signal read from said memory means indicates that the accompanying bits read from said memory means are the lower-significant bits of said digitized video signal, (2) said first fixed signal is produced when the selection code signal read from said memory means indicates that the accompanying bits read from said memory means are the higher-significant bits of said digitized video signal and when said decision means detects an increase in the value of the bits held in said register means, and (3) said second fixed signal is produced when the selection code signal read from said memory means indicates that the accompanying bits read from said memory means are the higher-significant bits of said digitized video signal and when said decision means detects a decrease of the value of the bits held in said register means.

2. A video signal processing circuit according to claim 1, wherein said first fixed signal is an all logic-zero signal (0000) and said second fixed signal is an all logic-1 signal (1111).

3. A video signal processing circuit according to claim 2, wherein digitized video signal is applied to an input terminal and said detecting means comprises a one-sample period delay circuit connected to said input terminal and a first comparing circuit connected to said one-sample period delay circuit and to said input terminal.

4. A video signal processing circuit according to claim 2, wherein said decision means comprises a shift register connected to the output terminal of said memory means and a second comparing circuit connected to said shift register and the output of said register means.

* * * * *